US 6,561,133 B2

(12) United States Patent
Robbins

(10) Patent No.: US 6,561,133 B2
(45) Date of Patent: *May 13, 2003

(54) GRAZING RANGE EXPANSION METHOD

(75) Inventor: Mark Alan Robbins, Sturgis, SD (US)

(73) Assignee: Hubbard Feeds, Inc., Mankato, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/059,806

(22) Filed: Jan. 28, 2002

(65) Prior Publication Data

US 2002/0104486 A1 Aug. 8, 2002

Related U.S. Application Data

(60) Continuation of application No. 09/745,609, filed on Dec. 21, 2000, which is a division of application No. 09/266,176, filed on Mar. 10, 1999, now Pat. No. 6,244,217.

(51) Int. Cl.[7] .............................. A01K 5/00; A01K 29/00
(52) U.S. Cl. ..................................... 119/174; 119/51.03
(58) Field of Search ........................... 119/51.01, 51.03, 119/52.4, 57.8, 61, 174; D1/100, 110; 426/1, 250, 635, 805, 807

(56) References Cited

U.S. PATENT DOCUMENTS

| D61,520 S | 9/1922 | Michalski | D1/110 |
|---|---|---|---|
| 2,801,609 A | 8/1957 | Webster | 119/51.03 |
| 3,259,106 A | 7/1966 | Ray et al. | 119/51.03 |
| 3,500,795 A | 3/1970 | Towlerton | 119/51.03 |
| 3,972,307 A | * 8/1976 | Marseillan | 119/51.01 |
| 4,338,336 A | 7/1982 | Glabe et al. | 426/1 |
| 4,986,220 A | * 1/1991 | Reneau et al. | 119/57.91 |
| 5,526,773 A | 6/1996 | Richardson | 119/61 |
| 5,572,954 A | * 11/1996 | Elkins | 119/51.01 |
| 5,622,739 A | 4/1997 | Benton et al. | 426/807 |
| 5,637,312 A | 6/1997 | Tock et al. | 119/174 |
| 5,758,598 A | 6/1998 | Rothert | 119/61 |
| 4,784,086 A | 11/1998 | Hand et al. | 119/61 |
| 5,862,777 A | * 1/1999 | Sweeney | 119/57.91 |
| 5,901,660 A | * 5/1999 | Stein | 119/51.02 |
| 6,117,458 A | 9/2000 | Morgan | 426/635 |
| 6,153,230 A | 11/2000 | Corley, Jr. | 426/635 |

OTHER PUBLICATIONS

Crystalyx Brand Supplements brochure, pp. 1–15.
Beef NutriTech, New Tools to Distribute Grazing brochure.
Crystalyx Brand Supplements, Dealer Reference Manual, BGF–30.
Pasture and Forages, *Modifying livestock grazing distribution by strategic placement of cooked molasses supplements*, D.W. Bailey and G.R. Welling, Montana State University, Havre, J. Anim. Sci. vol. 76, Suppl. 1/J. Dairy Sci. vol. 81, Suppl. Jan. 1998, 740, p. 191.
*Cattle Grazing and Behavior on a Forested Range*, Leonard Roy Roath and William C. Krueger, Journal of Range Management 35(3), May 1982, pp. 332–338.
*Cattle Distribution on Mountain Rangeland in Northeastern Oregon*, R.L. Gillen, W.C. Krueger, and R.F. Miller, Journal of Range Management 37(6), Nov. 1984, pp. 549–553.
*Salt and Meal–Salt Help Distribute Cattle Use on Semi-desert Range*, S. Clark Martin and Donald E. Ward, Journal of Range Management 26(2), Mar. 1973, pp. 94–97.

(List continued on next page.)

Primary Examiner—Charles T. Jordan
Assistant Examiner—Elizabeth Shaw
(74) Attorney, Agent, or Firm—Dorsey & Whitney LLP

(57) ABSTRACT

The present invention relates to a method for improving grazing distribution and an animal feed supplement for use therein. The method comprises the steps of identifying a plurality of underutilized rangeland areas and providing an animal feed supplement in a first underutilized rangeland area. The animal feed supplement attracts the livestock to the first underutilized rangeland area and encourages the livestock to graze once there.

20 Claims, 4 Drawing Sheets

OTHER PUBLICATIONS

*Response of Livestock to Riparian Zone Exclusion*, Larry D. Bryant, Journal of Range Management 35(6), Nov. 1982, pp. 780–785, pp. 780–785.

*Management of Cattle Distribution*, Derek W. Bailey and Larry R. Rittenhouse, Rangelands 11(4), Aug. 1989, pp. 159–161.

*An Approach for Setting the Stocking Rate*, Jerry L. Holechek, Rangelands 10(1), Feb. 1988, pp. 10–14.

*Declining forage availability effects on utilization and community selection by cattle*, Michael A. Smith, J. Daniel Rodgers, Jerrold L. Dodd, and Quentin D. Skinner, J. Range Manage, 45:391–395, Jul. 1992.

*Impacts of Cattle on Strambanks in Northeastern Oregon*, J. Boone Kauffman, W.C. Krueger, and M. Vavra, Journal of Range Management 36(6), Nov. 1983, pp. 683–685.

*Livestock Impacts on Riparian Ecosystems and Streamside Management Implications. . . A Review*, J. Boone Kauffman and W.C. Krueger, Journal of Range Management 37(5), Sep. 1984, pp. 430–438.

*Factors Affecting Utilization of Mountain Slopes By Cattle*, C. Wayne Cook, Dept. of Range Science, Utah State University, Logan, pp. 200–204.

*Use of Supplemental Feeding Locations to Manage Cattle Use on Riparian Areas of Hardwood Rangelands*, Neil K. McDougald, William E. Frost, and Dennis E. Jones, USDA Forest Service Gen. Tech. Rep. PSW–110, 1989, pp. 124–126.

*Grazing Management*, John F. Vallentine, Professor of Range Science, Brigham Young University, Provo, Utah, 1990, pp. 76–105.

*Rangeland Management for Livestock Production*, Hershel M. Bell, University of Oklahoma, 1973, pp. 190–216.

*Holistic Resource Management*, Allan Savory, Library of Congress Cataloging–in–Publication Data, 1988, pp. 250–263.

*Managing Livestock Grazing on Meadows of California's Sierra Nevada*, A Manager–User Guide, Univ. Calif., Div. Agric. & Nat. Resources Leaflet 21421, pp. 1–9.

U.S. Forest Service Rocky Mountain Forest and Range Experiment Station, 1980, Utilization Gauge, An Instrument for Measuring the Utilization of Grasses, American Slide –Chart Corp., Wheaton, Ill., 3 pgs.

*Managing Livestock Grazing on Meadows of California's Sierra Nevada*, A Manager–User Guide, Cooperative Extension University of California, Division of Agriculture and Natural Resources, Leaflet 21421.

George, Melvin, et al., "Practices and Strategies for Reducing Nonpoint Source Pollution and Protecting Biodiversity", [on line], Copyright 1998, URL: http://agronomy.ucdavis.edu/CALRNG/Project%20Descriptions/Practices.htm. (4pgs).

Warnert, Jeannette, "UC Scientists Use Observation to Study Cow Behavior", [on line], Aug. 10, 1998, http://www.uckac.ed/press/pressreleases98/cowbehavior.htm (2pgs).

"Cow behavior studied to protect enviornment", [on line], Aug. 18, 1998, http://www.enn.com/news/enn–stories/1998/08/081898/cows17_23073.asp, (2pgs).

* cited by examiner

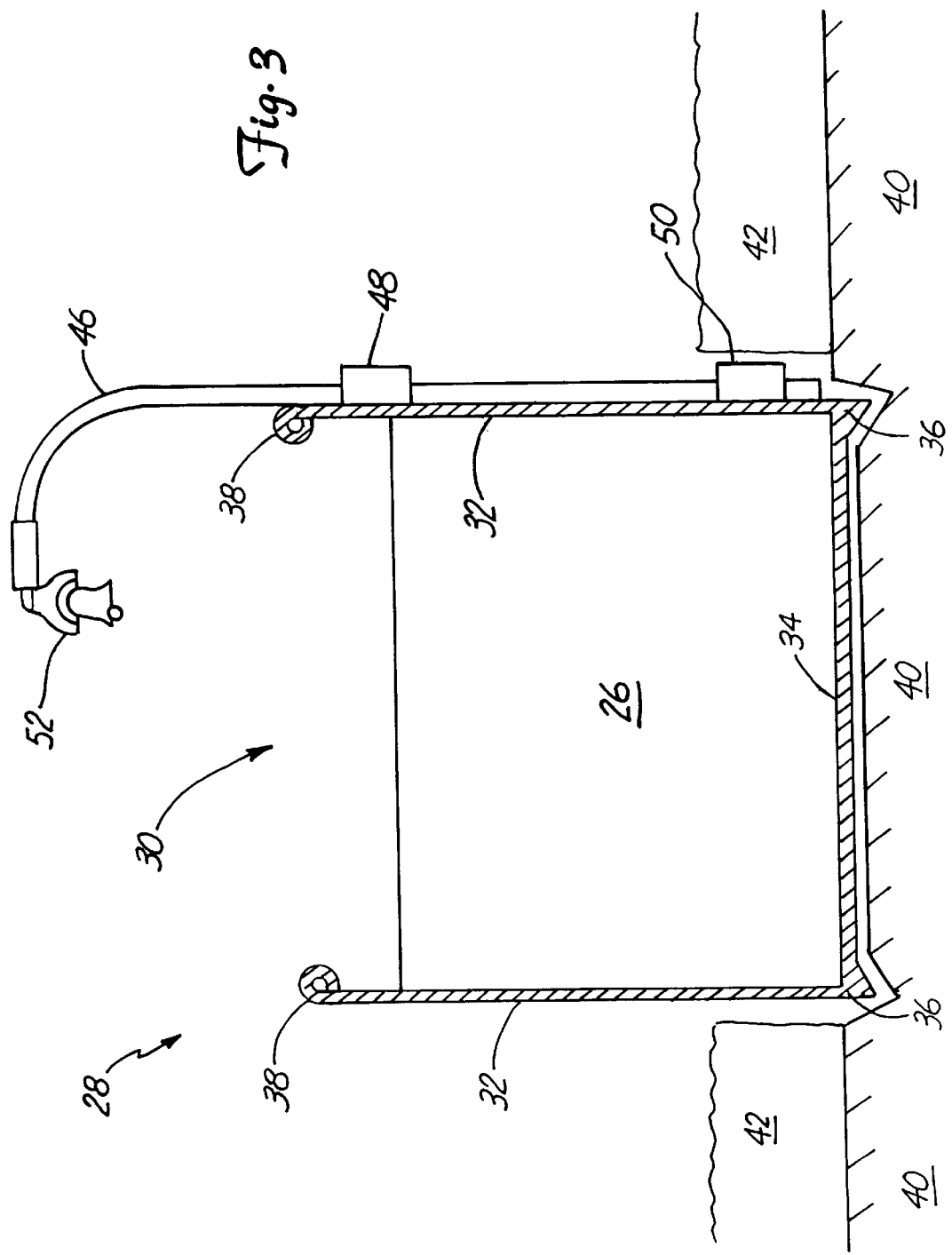

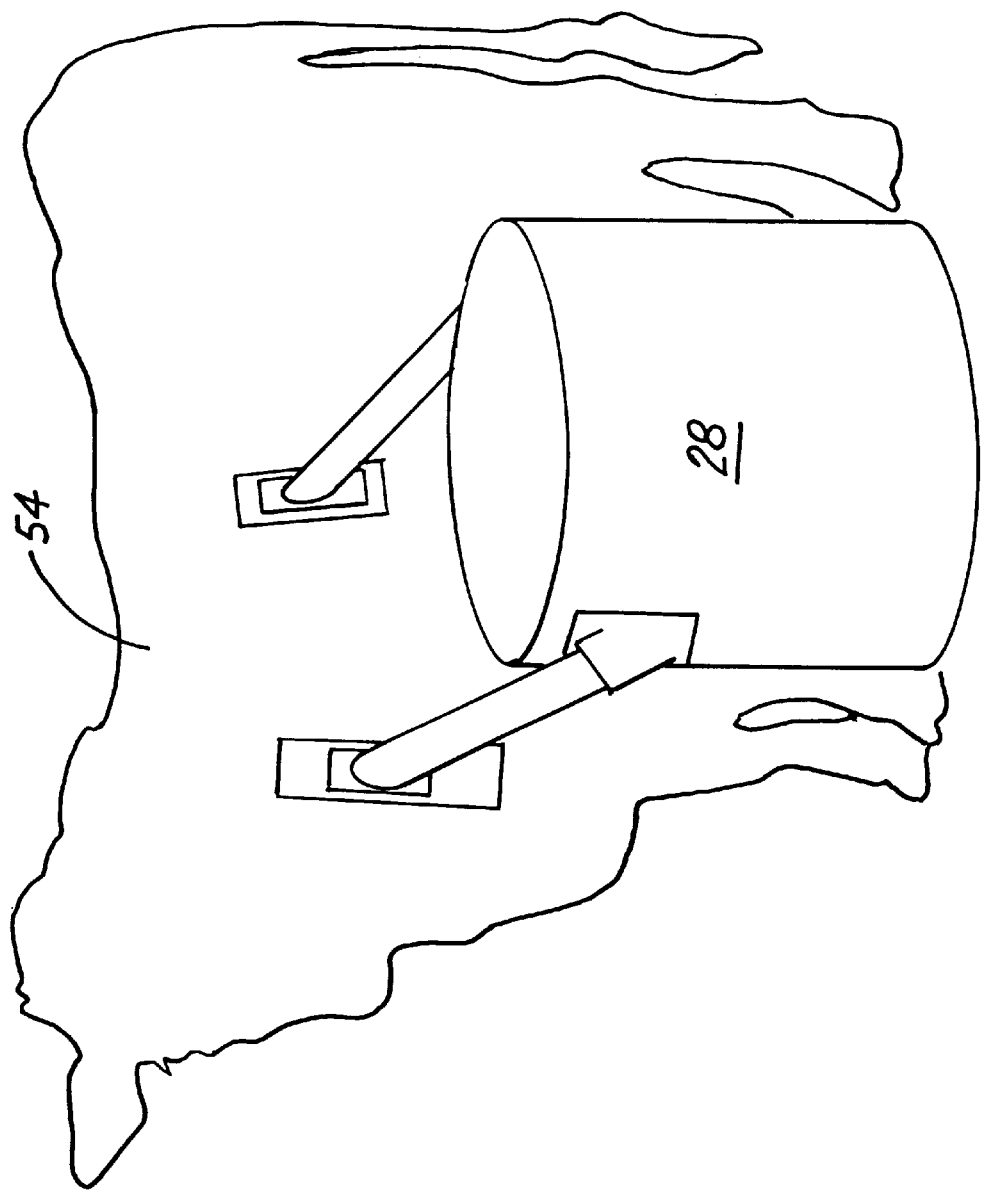

GRAZING RANGE EXPANSION METHOD

RELATED APPLICATIONS

This application is a continuation application of U.S. patent application Ser. No. 09/745,609, filed on Dec. 21, 2000, which is a divisional of U.S. patent application Ser. No. 09/266,176, filed on Mar. 10, 1999, now issued as U.S. Pat. No. 6,244,217, issued on Jun. 12, 2001, both of which are incorporated herein by reference.

FIELD OF THE INVENTION

The present invention relates generally to a method of expanding grazing range. More particularly, the present invention relates to a method of using an animal feed supplement to encourage livestock to graze in underutilized rangeland areas.

BACKGROUND

Cattle naturally avoid areas that are located far from water or that require them to climb steep slopes. This tendency causes the cattle to overgraze lowland riparian areas while ignoring abundant or high quality forage in other areas. This "localized overgrazing" causes several significant problems. First, it reduces the rancher's profit because it wastes forage. Second, the cattle trample the vegetation in resulting high-traffic areas near water sources. This increases pollution, causes erosion, and reduces stream bank stability. These effects can eventually result in watershed degradation and poor water quality. Finally, localized overgrazing prevents nutrients returned to the soil through manure from being spread to their best effect.

Increasing the natural grazing range of cattle can reduce these problems. One advantage of a large grazing range is that cattle consume forage in areas that would otherwise go unused. This allows existing acreage to support more head and can improve individual animal performance (e.g., increased body condition or higher weight gains). The resulting decrease in forage pressure on the lowland riparian areas also allows the local vegetation to grow more vigorously. This means that ranchers can maintain or even increase vegetative cover around lakes and streams. Finally, a large grazing range spreads manure over more acreage.

The prior art has suggested several methods to solve this localized overgrazing problem. These methods include fencing, herding, constructing water developments, and strategically placing salt blocks. However, all of these methods have significant drawbacks. Fencing, for example, requires that the rancher build a physical barrier to force the cattle into the underutilized areas. This requires a large capital outlay, because the rancher must build a barrier capable of holding the cattle. Fences also have significant maintenance costs, are impractical in rugged areas, and may be illegal on public land.

Water developments, like fences, are expensive to build and are impractical in rugged areas. In addition, water developments have limited effectiveness because they cannot be moved easily. This drawback often creates a new area of localized overgrazing. Finally, water developments frequently require an external power source to maintain the fluid level and may not be permitted in environmentally sensitive areas.

Herding is an expensive, short term method of extending grazing range. Herding requires that a rancher push the cattle into the underutilized rangeland areas. This process is labor intensive because the rancher must travel to the cattle's location and remain with them until they reach the desired areas. The entire process must be frequently repeated because the cattle need to return to the riparian areas for water.

The strategic placement of salt blocks has also been suggested as a tool to improve grazing distribution. However, research has shown that salt does not effectively attract cattle to the underutilized rangeland areas or encourage them to consume the forage around the salt block.

For the foregoing reasons, there is a need for a new method of extending grazing distribution so that the livestock will better utilize the existing rangeland.

SUMMARY

The present invention is directed at a method of improving grazing distribution by encouraging livestock to feed in underutilized rangeland areas. The method comprises the steps of identifying a plurality of underutilized rangeland areas and providing an animal feed supplement in at least one underutilized rangeland area. Livestock are attracted to the underutilized rangeland area by the animal feed supplement.

The animal feed supplement of the preferred embodiment is made from a highly palatable, self-limiting, molasses-based material. This combination of features attracts the livestock to the underutilized area and causes them to consume the local forage. The supplement block of the preferred embodiment is also portable and weatherproof. This allows the rancher to place the supplement in a first underutilized rangeland area, leave it unattended until the livestock utilize the local forage, and then move the supplement to a new underutilized area.

BRIEF DESCRIPTION OF THE DRAWINGS

These and other features, aspects, and advantages of the present invention will become better understood with reference to the following description, appended claims, and accompanying drawings where:

FIG. 3 is an sectional view of a supplement container.

FIG. 4 is a pictorial view of a supplement container attached to an animal silhouette.

DESCRIPTION

Figure 1:
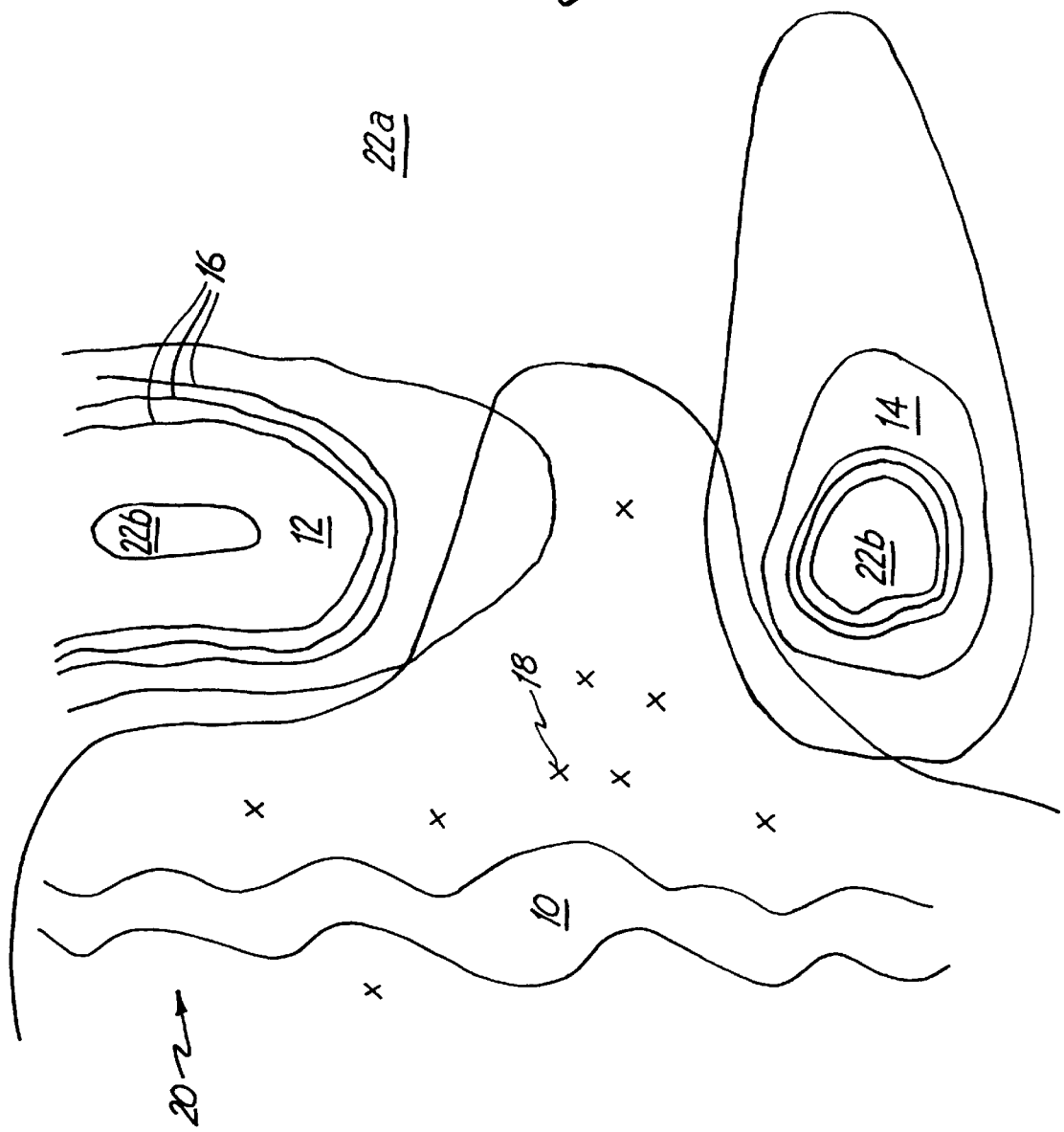
FIG. 1 is a topographic map showing the natural grazing distribution of livestock.

FIG. 1 is a topographic map that shows an area of rangeland having a stream 10 and steep hills 12 and 14. The location and grade of the hills 12 and 14 are indicated by contour lines 16. FIG. 1 also shows the location of livestock 18 within their natural grazing area 20.

An underutilized rangeland area 22 is a place where a rancher wants his or her livestock 18 to spend more time or to consume more of the local forage. Because livestock 18 have a natural tendency to graze lowland riparian forage, underutilized rangeland 22 will typically be located in areas 22a that are significant distance from water or in areas 22b that require that the livestock cross steeply sloped terrain. Underutilized rangeland areas 22 will also tend to contain relatively abundant and/or high quality forage.

A rancher can identify underutilized areas 22 by periodically visiting the available grazing land and looking for locations having thick vegetative cover and high plant vigor.

Other embodiments of this invention use more advanced detection methods to identify the underutilized areas 22. These methods include testing the forage to determine its nutrient value, aerial photography, satellite imagery, and remote sensors.

Figure 2:
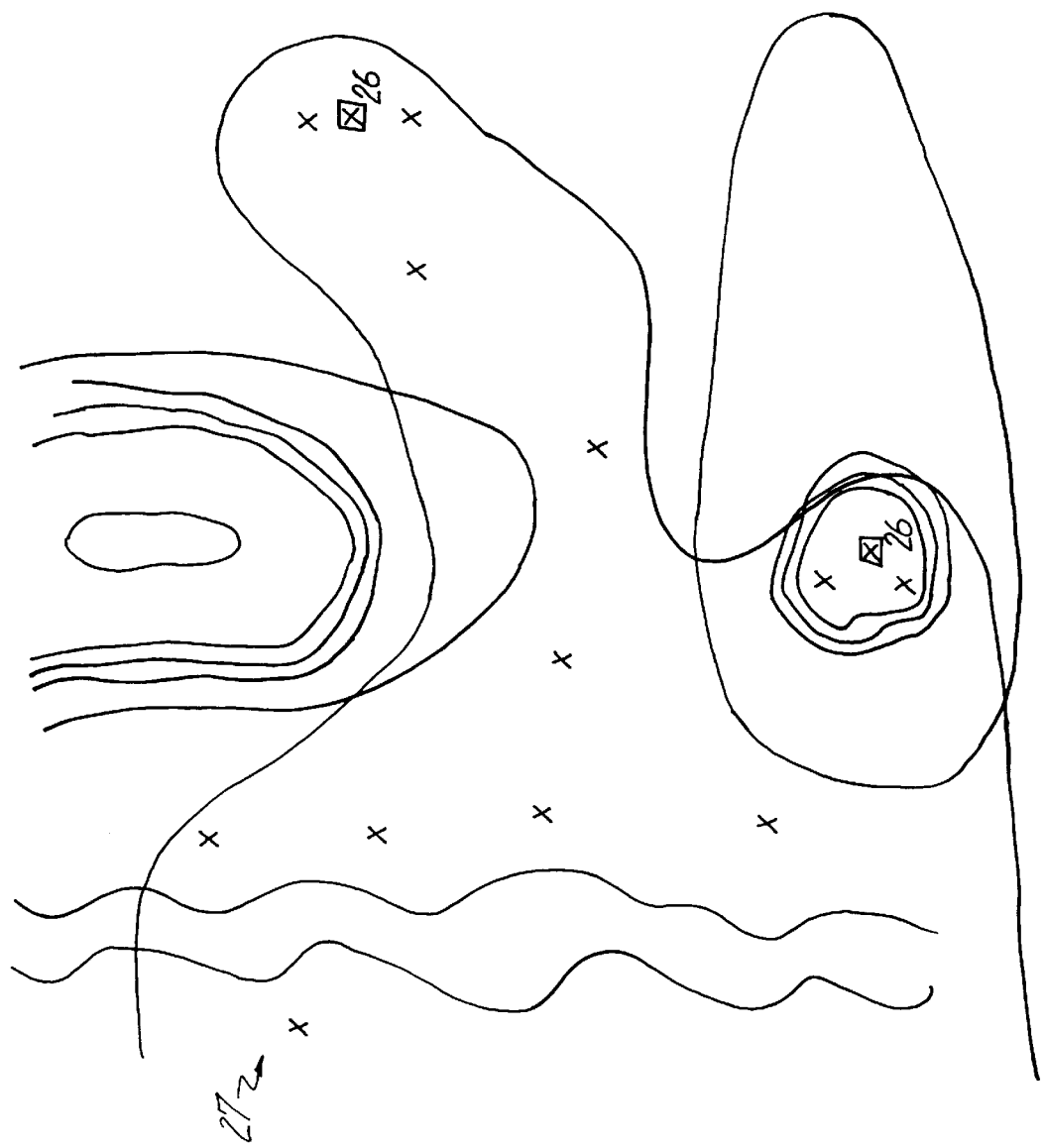
FIG. 2 is a topographic map showing the grazing distribution after supplementation.

FIG. 2 is a topographic map of the same rangeland area shown in FIG. 1. A rancher will attract the livestock 18 from their natural grazing areas 20 to the underutilized rangeland areas 22a and 22b using an animal feed supplement 26 of the type described herein. This results in an improved grazing distribution 27.

This invention is more effective when the supplement 26 is only provided in a few of the underutilized areas and when these locations are periodically rotated. This aspect of the invention prevents the livestock 18 from overgrazing the forage around the more accessible locations and ignoring the forage around the less accessible locations. This aspect of the invention also lowers the initial capital cost because the rancher does not need to stock as many supplement locations. This invention is also more effective when the supplement 26 is provided in an area from which the livestock 18 can periodically travel to a source of water.

If the rancher chooses to provide supplement 26 in several locations, the rancher should try to place them in equivalent positions. Equivalence occurs in areas where the livestock 18 use the supplement 26 at an approximately equal rate. Equivalent positions can be identified by monitoring the amount of supplement 26 consumed at a particular location and moving its position accordingly.

The animal feed supplement 26 used in this invention should be made from a highly palatable, consumption limited material. Palatability refers to the extent that the livestock 18 desire the product and is related to the product's taste and nutrition content. Highly palatable supplements 26 are preferred, because they encourage livestock 18 to travel greater distances to consume the product. Consumption limits refer to the inability of livestock 18 to satisfy their craving for the product in one feeding session. Consumption limits can be imposed by choosing a supplement material that cannot be consumed rapidly (i.e., a "self-limiting supplement") or by using a mechanical apparatus to limit the supplement's availability. Consumption limited supplements 26 are desirable, because they encourage the livestock 18 to spend more time around the supplement source. The combination of highly palatability and limited consumption is particularly desirable for the present application, because it causes the livestock 18 to travel significant distances to the supplement 26, to remain in the underutilized area 22, and to consume the local forage between their repeated limited consumption of the supplement 26. A suitable supplement could be a molasses product that is dehydrated to reduce the moisture content and fortified with vitamins, minerals, and other protein sources. Other suitable supplements include, but are not limited to: a liquid supplement in a consumption limiting container, a chemical block, or a pressed block.

It is also desirable that the supplement 26 contain those specific proteins, fat, vitamins, macro minerals, and trace minerals that the livestock require for proper nutrition. Studies have shown that the protein content of the forage limits the animal's weight gain because low protein levels reduce consumption and suppress microbial fermentation in the animal's digestive system. Nutrition supplements have also been shown to improve the overall body condition and the reproductive performance of the livestock 18.

The preferred embodiment of this invention is based on a solid feed supplement 26 sold under the trade name CRYS-TALYX® BGF-30 by Hubbard Feeds, Inc., P.O. Box 8500, 424 North Riverfront Drive, Mankato, Minn. 56001. CRYSTALYX® BGF-30 is a molasses-based supplement block manufactured to be fed to cattle free choice. It contains: molasses products, concentrated separator by-product, animal protein products, plant protein products, animal fat (preserved with ethoxyquin), processed grain by-products, urea, monocalcium phosphate, dicalcium phosphate, calcium carbonate, sulfur, magnesium oxide, manganese sulfate, zinc sulfate, copper sulfate, ethylenediamine dihydriodide, calcium iodate, cobalt carbonate, sodium selenite, vitamin A acetate, D-activated animal sterol (source of vitamin $D_3$) and vitamin E supplement. These ingredients are dehydrated to reduce the moisture content and result in the following nutrient analysis:

CRYSTALYX® BGF-30

NUTRIENT ANALYSIS

| | |
|---|---|
| Crude Protein, min | 30.0% |
| (Including not more than 12.0% equivalent crude protein as non-protein nitrogen.) | |
| Crude Fat, min | 4.0% |
| Crude Fiber, max | 2.5% |
| Calcium (Ca), min | 2.0% |
| Calcium (Ca), max | 2.5% |
| Phosphorus (P), min | 2.0% |
| Potassium (K), min | 2.5% |
| Magnesium (Mg), min | 0.5% |
| Cobalt (Co), min | 3.3 ppm |
| Copper (Cu), min | 330 ppm |
| Iodine (I), min | 17 ppm |
| Manganese (Mn), min | 1,330 ppm |
| Selenium (Se), min | 4.4 ppm |
| Zinc (Zn), min | 1,000 ppm |
| Vitamin A, min | 80,000 IU/lb |
| Vitamin D, min | 8,000 IU/lb |
| Vitamin E, min | 30 IU/lb |
| Salt (NaCl) | none added |

CRYSTALYX® BGF-30 has a number of beneficial properties. For example, CRYSTALYX® BGF-30 is weatherproof so that a rancher can leave this supplement block in the underutilized rangeland areas 22 without losses to wind or rain. Furthermore, the CRYSTALYX® BGF-30 block only has 2% to 6% moisture content. This is desirable because it reduces the transportation cost necessary to use the invention in remote and rugged areas. Finally, CRYSTALYX® BGF-30 improves the livestock's digestion by providing a good growth medium in the animal's rumen for the bacteria that break down vegetable material.

Other animal feed supplement formulas are within the scope of this invention, several of which are well known in the art. These supplements generally contain the following nutritional content:

| NUTRIENT ANALYSIS | MINIMUM | MAXIMUM |
|---|---|---|
| Crude Protein | 4.0% | 65.0% |
| Crude Fat | 2.0% | 12.0% |
| Crude Fiber | 0.5% | 4.0% |
| Calcium (Ca) | 0.4% | 10.0% |
| Phosphorus (P) | 0% | 10.0% |
| Salt (NaCl) | 0% | 10.0% |
| Potassium (K) | 0.5% | 6.0% |
| Magnesium (Mg) | 0.15% | 6.0% |
| Cobalt (Co) | 1.0 ppm | 15 ppm |

-continued

| NUTRIENT ANALYSIS | MINIMUM | MAXIMUM |
| --- | --- | --- |
| Copper (Cu) | 15 ppm | 1,000 ppm |
| Iodine (I) | 2.0 ppm | 100 ppm |
| Manganese (Mn) | 25 ppm | 3,000 ppm |
| Selenium (Se) | 0 ppm | 30 ppm |
| Zinc (Zn) | 25 ppm | 3,400 ppm |
| Vitamin A | 0 IU/lb | 200,000 IU/lb |
| Vitamin D | 0 IU/lb | 40,000 IU/lb |
| Vitamin E | 0 IU/lb | 1,000 IU/lb |
| Non-protein Nitrogen | 0% | 52% |

The actual nutrient content depends on whether the supplement is designed to have high protein, low protein, or trace mineral fortification.

The animal feed supplement 26 used in this invention should be provided in a container 28 such as that shown in FIG. 3. This container 28 is generally configured into a barrel shape having an open top 30, a side wall 32, a bottom 34, a protruding bottom lip 36, and a top edge 38. The open top 30 should be large enough to allow easy access to the supplement 26 and the bottom 34 should be wide enough to prevent livestock from tipping the container 28. The top edge 38 is preferably formed into a shape that prevents livestock from injuring themselves when consuming the supplement 26.

The weight of the container 28 and of the supplement 26 drives the protruding lip 36 into the ground 40. This feature makes the container 28 particularly desirable for winter use on steeply sloped hillsides because it deters sliding motion caused by livestock or by gravity in snow, ice or other slippery conditions. Making the supplement 26 essentially immnovable by livestock even when the container 28 is almost empty helps insure that the livestock-attracting focus remains in the same location in the underutilized rangeland. However, the size and weight should be consistent with the need to deliver the filled containers 28 to somewhat remote terrain.

The preferred embodiment uses a steel half-barrel that is large enough to contain about 250 pounds of supplement. One advantage of this embodiment is that the steel construction prevents livestock 18 from biting or trampling the supplement 26. This advantage enhances the self-limiting feature of the preferred supplement formula. Another advantage of the preferred embodiment is its ability to be recycled. Despite these advantages, however, other embodiments are possible. For example, the container 28 could be made from plastic, cardboard, or aluminum instead of steel and the rounded top edge 38 could be replaced by a plastic protector. Other container sizes, shapes, and materials consistent with the above objectives are also within the scope of this invention.

The effectiveness of this invention increases if the livestock 18 develop an association between the supplement 26 and an identifier associated with the supplement. Although a wide variety of features can function as an identifier, an effective identifier should be capable of signaling the location of the supplement 26 to the livestock 18 over a significant distance. This association need only be trained into a portion of the herd. The rest of the animals will naturally develop the association, because livestock 18 are naturally drawn towards other livestock 18. That is, the existence of a crowd of livestock 18 will draw additional livestock to that location.

One possible identifier is the color of the supplement container 28. Although this color can be any shade that livestock can perceive, it is desirable that the color contrast with the container's surroundings throughout the year. Black containers appear to be easily perceived both in winter snow and in rangeland having light brown color tones. The dark colors, like black, are also desirable because they absorb solar energy. This causes the container to melt into any underlying snow or ice 42 and helps the container 28 remain where the rancher placed it.

Another possible identifier is the odor of the supplement 26. Although this odor can be any scent that livestock can perceive, it is desirable that the odor be relatively unusual. This will prevent the livestock 18 from confusing the identifier odor with naturally occurring scents. One embodiment of this invention uses onion by-products to produce an onion odor identifier.

A third possible identifier is a sound. Like color or odor identifiers, sonic identifiers can be anything perceivable by livestock 18. However, it is desirable that the identifying noise be easily distinguishable from naturally occurring sounds. In one embodiment of this invention a flexible pole 46 is attached to the container 28 by supports 48 and 50. A bell 52 is attached to the flexible pole 46 opposite the supports 48 and 50. Livestock 18 hit the pole 46 while feeding on the supplement 26 and cause the bell 52 to ring. This sound alerts other livestock to the supplement's location and to the presence of other animals. These two factors combine to draw the other livestock 18 to the underutilized area 22. Other embodiments of this invention replace the bell 52 with a wind-chime. The wind-chime alerts livestock to the supplement's location whenever the wind blows.

It will be easier to establish the initial connection between the livestock 18 and the supplement 26 if the identifier is naturally attractive to the animals. That is, a naturally attractive container (color or configuration) or sound may appeal to the curiosity of an animal 20 that has not previously experienced the supplement 26 and draw its presence for a taste. Similarly, a naturally attractive odor may lure the animal 20 to the supplement 26 and cause it to try the product. These initial tastes will establish the desirability of the product. The onion odor used in one embodiment of this invention is one such naturally attractive identifier.

The natural instinct of livestock to congregate can also be used to enhance the effectiveness of this invention. As shown in FIG. 4, a decoy 54 can be attached (preferably, removably attached) to the container 28. The decoy 54 will initially attract livestock 18 to the supplement location. This, in turn, will attract additional animals to the underutilized area 22.

The previously described embodiments of the present invention have many advantages over the prior art, including low initial capital requirements, low maintenance costs, low labor costs, high portability, and high effectiveness. In particular, the animal feed supplement blocks 26 used in the preferred embodiment have been shown to be more effective in extending grazing range than salt blocks. A study was conducted by the Montana State University to determine whether livestock grazing distribution could be improved by strategically placing low moisture, molasses based supplement blocks 26. The research team divided a study area into pastures having easy, moderate, difficult, and inaccessible terrain. The study further divided the pastures having moderate and difficult terrain into control and supplement sites. The research team provided a CRYSTALYX® BGF-30 block in the supplement sites. The team also provided a salt block in half of the sites in both control and supplement groups. Every seven to ten days, the research team moved the supplement and the salt blocks to new locations.

The study compared the livestock's use of the control and supplement sites by measuring forage utilization and fecal pat abundance before supplementation and after removal. The researchers observed more livestock in areas with the supplement (32±8%) than in control areas (3±2%). They also measured an increase in the number of fecal pats (3.3±7 pats/100 m$^2$ vs. 0.5±0.5 pats/100 m$^2$) and in forage utilization (17±2% vs. −1±1%) in areas containing supplement. However, the study did not find significant differences between the sites containing a salt block and those that did not contain salt. These results indicate that CRYSTALYX® BGF-30 was more effective in extending grazing range than were the salt blocks. For more information about this study, see Bailey & Welling, J. Anim. Sci., Vol. 76, Suppl. 1, p. 191 (1998), which is hereby incorporated by reference.

Animal feed supplement blocks 26 have other important advantages over salt blocks. The blocks 26 used by the preferred embodiment improve digestion by helping livestock 18 break down cellulose. This helps the livestock better utilize the grass it eats. The blocks 26 used by the preferred embodiment also help increase forage intake by providing protein. This leads to higher livestock body weight and more money for the rancher. Finally, animal feed supplement blocks can provide a variety of important vitamins and minerals not found in a salt block.

Although the present invention has been described in considerable detail with reference to certain preferred embodiments thereof, variations are possible. For example, this invention could be optimized for use with other types of domesticated animals, such as horses, sheep, deer, and elk, by switching the animal feed supplement 26 to a formula that appeals to that particular species. Appropriate supplements, such as CRYSTALYX® STABLE-LYX® for horses and CRYSTALYX® SHEEP-LYX for sheep, are well known in the art. The animal feed supplement described in this invention could also include compounds designed to increase livestock performance, such as ingestable hormones, antibacterial drugs, or stimulants. Therefore, the spirit and scope of the appended claims should not be limited to the description of the preferred versions contained herein.

I claims:

1. A method of controlling grazing distribution by utilizing low-moisture blocks to encourage the presence of foraging animals in underutilized rangeland or pasture areas, the method comprising:
    identifying at least one underutilized rangeland area; and
    providing at least one highly-palatable, portable, self-limiting low-moisture block in the underutilized rangeland area to attract the foraging animals to the underutilized rangeland area and to increase a length of stay of the animals in the underutilized rangeland area;
    wherein the animals are attracted to the underutilized rangeland area by the low-moisture block.

2. The method of claim 1 wherein the low-moisture block has a moisture content of about 2% to about 6% by weight.

3. The method of claim 1 wherein the low-moisture block is provided in a container.

4. The method of claim 3 wherein the container has a decoy attached to the side wall of the container, the decoy being in the shape of a foraging animal, the decoy being used to attract foraging animals to the low-moisture block.

5. The method of claim 3 wherein the container has a decoy attached to the side wall of the container, the decoy being in the shape of a foraging animal, the decoy being used to attract foraging animals to the low-moisture block.

6. The method of claim 3 further comprising providing an identifier near the container holding the low-moisture block, the identifier being perceivable by the foraging animals.

7. The method of claim 6 wherein the identifier is a bell or a wind-chime.

8. The method of claim 6 wherein the identifier is a color that contrasts with the container's surroundings throughout the year, the color being perceivable by the foraging animals.

9. The method of claim 6 wherein the container has a bottom and a side wall, the bottom of the container having a protruding lip that protrudes into the ground to deter movement of the container.

10. The method of claim 6 wherein the identifier is an odor that can be perceived by foraging animals, the odor being one that is relatively unusual and not naturally occurring in the rangeland.

11. The method of claim 6 wherein the identifier is a bell or a wind-chime.

12. The method of claim 6 wherein the identifier is a color that contrasts with the container's surroundings throughout the year, the color being perceivable by the foraging animals.

13. The method of claim 6 wherein the container has a bottom and a side wall, the bottom of the container having a protruding lip that protrudes into the ground to deter movement of the container.

14. The method of claim 6 wherein the identifier is an odor that can be perceived by foraging animals, the odor being one that is relatively unusual and not naturally occurring in the rangeland.

15. The method of claim 1 wherein the low-moisture block contains no added salt.

16. The method of claim 1 wherein the low-moisture block includes a growth medium in a rumen of the animal to enhance the animal's digestion of forage.

17. The method of claim 1 further comprising inspecting the available rangeland to locate areas containing abundant forage or high quality forage.

18. The method of claim 1 wherein the low-moisture block contains no added salt.

19. A method of controlling grazing distribution by utilizing low-moisture blocks to encouraging the presence of foraging animals in underutilized rangeland areas, the method comprising:
    identifying at least one underutilized rangeland area;
    providing at least one highly-palatable, portable, self-limiting low-moisture block in the underutilized rangeland area to attract the foraging animals to the underutilized rangeland area;
    placing the low-moisture block in a container having an open top; and
    providing an identifier near the container, the identifier being perceivable by the foraging animals;
    wherein the animals are attracted to the underutilized rangeland area by the low-moisture block and the identifier.

20. The method of claim 19 wherein the low-moisture block has a moisture content of about 2% to about 6% by weight.

* * * * *